US010260510B2

(12) United States Patent
Narita

(10) Patent No.: US 10,260,510 B2
(45) Date of Patent: Apr. 16, 2019

(54) FAN, MOTOR AND MANUFACTURING METHOD THEREOF

(71) Applicant: MINEBEA CO., LTD., Kitasaku-gun, Nagano (JP)

(72) Inventor: Toru Narita, Kitasaku-gun (JP)

(73) Assignee: MINEBEA CO., LTD., Kitasaku-gun (JP)

(*) Notice: Subject to any disclaimer, the term of this patent is extended or adjusted under 35 U.S.C. 154(b) by 348 days.

(21) Appl. No.: 14/226,959

(22) Filed: Mar. 27, 2014

(65) Prior Publication Data

US 2014/0294621 A1 Oct. 2, 2014

(30) Foreign Application Priority Data

Mar. 27, 2013 (JP) .................................. 2013-065493
Mar. 4, 2014 (JP) ................................. 2014-042155

(51) Int. Cl.
*H02K 5/08* (2006.01)
*F04D 25/06* (2006.01)
*H02K 5/128* (2006.01)

(52) U.S. Cl.
CPC ....... *F04D 25/0613* (2013.01); *F04D 25/062* (2013.01); *F04D 25/0646* (2013.01);
(Continued)

(58) Field of Classification Search
CPC ............. F04D 25/0613; F04D 25/0646; F04D 25/068; F04D 19/00; F04D 19/002;
(Continued)

(56) References Cited

U.S. PATENT DOCUMENTS

2007/0145842 A1* 6/2007 Zhu ....................... F04D 29/582
310/88
2007/0177993 A1* 8/2007 Nakamichi ......... F04D 13/0673
417/354
(Continued)

FOREIGN PATENT DOCUMENTS

JP 2003-172300 A 6/2003
JP A-2003-230246 8/2003
(Continued)

OTHER PUBLICATIONS

Mar. 2017 Office Action issued in Japanese Patent Application No. 2014-042155.

*Primary Examiner* — Philip E Stimpert
(74) *Attorney, Agent, or Firm* — Oliff PLC

(57) ABSTRACT

A fan includes: a casing including a substantially cup-shaped base portion connected to an outer frame through a rib, the base portion having a top surface located on a upper side of an axial direction and a lower opening located on a lower side of the axial direction; a bearing housing hanging down from a center of the top surface of the base portion toward the lower opening; a stator housing portion formed by the base portion and the bearing housing; a stator having a circuit board disposed in the stator housing portion by being fitted to an outer peripheral surface of the bearing housing; bearings fitted to an inner peripheral surface of the bearing housing; an impeller rotating around a shaft as a central axis, shaft being rotatably supported by the bearings; and an insulating material filling the stator housing portion to cover the stator and the circuit board.

10 Claims, 8 Drawing Sheets

(52) U.S. Cl.
CPC ............... *H02K 5/08* (2013.01); *H02K 5/128* (2013.01); *H02K 2211/03* (2013.01); *Y10T 29/49009* (2015.01)

(58) Field of Classification Search
CPC .... F04D 25/06; F04D 25/0606; F04D 25/062; F04D 25/08; F04D 29/04; F04D 29/046; F04D 29/049; F04D 29/05; F04D 29/056; F04D 29/059; F04D 29/08; F04D 29/52; F04D 29/522; H02K 5/08; H02K 5/128; H02K 2211/03; H02K 5/00; H02K 5/04; H02K 15/12; Y10T 29/49009; B29C 39/10
USPC .................................................. 417/353, 354
See application file for complete search history.

(56) References Cited

U.S. PATENT DOCUMENTS

| | | | |
|---|---|---|---|
| 2010/0310390 A1 | 12/2010 | Huang et al. | |
| 2012/0039730 A1* | 2/2012 | Shen | F04D 29/083 417/423.7 |
| 2012/0319543 A1 | 12/2012 | Adachi et al. | |

FOREIGN PATENT DOCUMENTS

| | | |
|---|---|---|
| JP | 2007-174896 A | 7/2007 |
| JP | 2009-247143 A | 10/2009 |
| JP | A-2011-78224 | 4/2011 |
| JP | 2013-21903 A | 1/2013 |

* cited by examiner

PRIOR ART

PRIOR ART

FAN, MOTOR AND MANUFACTURING METHOD THEREOF

TECHNICAL FIELD

The present invention relates to a fan, in particular, to a fan and a motor having a waterproof structure, and a manufacturing method thereof.

BACKGROUND ART

Conventionally, a fan is installed to a control device of a machine tool and the like so as to cool the control device. The fan is exposed in a wet environment subjected to water, cutting fluid and the like, since the fan is located in the vicinity of the machine tool and the like. Therefore, the fans provided with an oil resistant and water resistant structure (hereinafter, merely referred to as "a waterproof structure") are known in use for the control device of the machine tools and the industrial machines, as described in Japanese Patent Application Laid-Open Publications No. 2003-230246 and No. 2011-78224.

FIG. 7 shows a cross-sectional view of a fan provided with a waterproof structure disclosed in Japanese Patent Application Laid-Open Publication No. 2003-230246. The fan shown in FIG. 7 has a structure in which a mold portion is formed by an insulating resin 106 as follows. A stator assembly 103 with a circuit board 102 and a stator 101 is mounted to a bearing housing (bearing supporting cylindrical portion) 105a of a casing 104, and then a forming mold 108 is fixed to the casing 104. An insulating resin 106 is injected into the mold 108, so that a space portion 107 between the bearing housing 105 and a plate-like portion 105b of the casing 104 includes the stator 101 and the circuit board 102 therein, and the molded portion is formed by the insulation resin 106.

FIG. 8 shows a technology for forming a molded portion of the fan equipped with a waterproof structure disclosed in Japanese Patent Application Laid-Open Publication No. 2011-78224. According to the technology for forming a molded portion of the fan shown in FIG. 8, an epoxy resin 204 is poured into a mold 203 after placing a stator 200, a circuit board (PC board) 201 and a lead wire 202 between an upper die 203a and a lower mold 203b of the mold 203, and the resin molded portion is formed in one piece.

As described above, according to the technology described in Japanese Patent Application Laid-Open Publication No. 2003-230246 and the technology described in Japanese Patent Application Laid-Open Publication No. 2011-78224, the resin molded portion is formed using a forming mold in order to make the stator and the circuit board to be a waterproof structure.

However, in the method of forming a resin molded portion using a forming mold, there was a need to set an intermediate assembly composed of a stator attached with a circuit board to a forming mold individually, and so there existed a problem that several working steps were required. In addition, the insulating resin injected into the forming mold required certain period of time for curing. For this reason, in performing an efficient mass production, it was necessary to prepare not only one but a plurality of forming molds and use them simultaneously in order to proceed other operations in parallel while waiting the curing of the insulating resin. Therefore, there existed a problem that the cost was high.

CITATION LIST

Patent Literature

Patent Literature 1: Japanese Patent Application Laid-Open Publication No. 2003-230246
Patent Literature 2: Japanese Patent Application Laid-Open Publication No. 2011-78224

SUMMARY OF INVENTION

Technical Problem

Accordingly, the present invention has been made in view of the above problems, and the object of the present invention is to provide a waterproof type fan in which it is possible to form a waterproof structure on the stator and the circuit board without using a mold for forming the resin molded portion, and a manufacturing method thereof.

Further, the object of the present invention is to provide a motor in which it is possible to form a waterproof structure on the stator and the circuit board without using a mold for forming the resin molded portion so as to be favorably used for a waterproof type fan and the like.

Solution to Problem

The present invention has been proposed in order to achieve the above objects, and aspects thereof can be understood by the following configurations.

(1) In accordance with a first aspect of the present invention, a fan comprises: a casing comprising a substantially cup-shaped base portion connected to an outer frame through a rib, the base portion having a top surface located on a upper side of an axial direction and an lower opening located on a lower side of the axial direction; a bearing housing hanging down from a center of the top surface of the base portion toward the lower opening; a stator housing portion formed by the base portion and the bearing housing; a stator provided with a circuit board and disposed in the stator housing portion by being fitted to an outer peripheral surface of the bearing housing; a bearing fitted to an inner peripheral surface of the bearing housing; an impeller rotating around a shaft as a central axis, the shaft being rotatably supported by the bearing; and an insulating material filling the stator housing portion to cover the stator and the circuit board.

(2) In the above configuration (1), the base portion and the bearing housing may be integrally formed.

(3) In the above configuration (1), the base portion may comprise a central hole at the center of the top surface, the central hole having a peripheral wall projecting toward the lower opening, and the bearing housing may be fixed to the peripheral wall.

(4) In any one of the above configurations (1) to (3), the circuit board may be fixed to a lower portion of the stator and provided with an opening portion to pour the insulating material into the stator housing portion.

(5) In any one of the above configurations (1) to (4), the bearing housing may be closed at the lower end thereof by a bottom cap.

(6) In any one of the above configurations (1) to (4), the lower opening of the base portion may be closed by a bottom lid.

(7) In any one of the above configurations (1) to (6), the base portion may have a large-diameter portion in a side of the lower opening, a small-diameter portion disposed upside the large-diameter portion, and a horizontal step surface connecting the large-diameter portion and the small-diameter portion, wherein the horizontal step surface may have along an outer peripheral surface thereof an annular protruding portion projecting toward a lower end surface of the impeller, and wherein the projection portion may have an inner peripheral surface facing at least a part of an outer peripheral surface of a rotor which rotates integrally with the impeller.

(8) In accordance with a second aspect of the present invention, a motor comprises: a substantially cup-shaped base portion with a cylindrical portion hanging down from a central part of a top surface toward an lower opening to form an annular space surrounding the cylindrical portion; a bearing fitted to an inner peripheral surface of the cylindrical portion; a rotor rotating around a shaft as a central axis, the shaft being rotatably supported by the bearing; a stator disposed in the annular space and fitted to an outer peripheral surface of the cylindrical portion; and an insulating material filling the annular space to cover the stator.

(9) In the above configuration (8), the rotor may have an impeller for blowing.

(10) In accordance with a third aspect of the present invention, a method of manufacturing a fan comprises: a step of forming a casing comprising a substantially cup-shaped base portion connected to an outer frame through a rib, the base portion having a bearing housing hanging down from a central part of a top surface toward an lower opening; a step of inserting bearings into an inside of the bearing housing; a step of inserting a stator to the bearing housing from the lower opening to place the stator into an inside of the base portion; a step of filling an inside of the base portion with an insulating material after placing the stator to cover the stator with the insulating material; and solidifying the insulating material.

Advantageous Effects of Invention

According to the present invention, the stator and the circuit board can be isolated and waterproofed from the environment such as water, the cutting oil and the like without performing resin molding process using a mold, by injecting an insulating resin into the stator housing portion after placing the stator with the circuit board fixed thereto in the stator housing portion. Therefore, the mold for forming the waterproof structure is not required and the manufacturing cost can be reduced.

DESCRIPTION OF EMBODIMENTS

Figure 1:
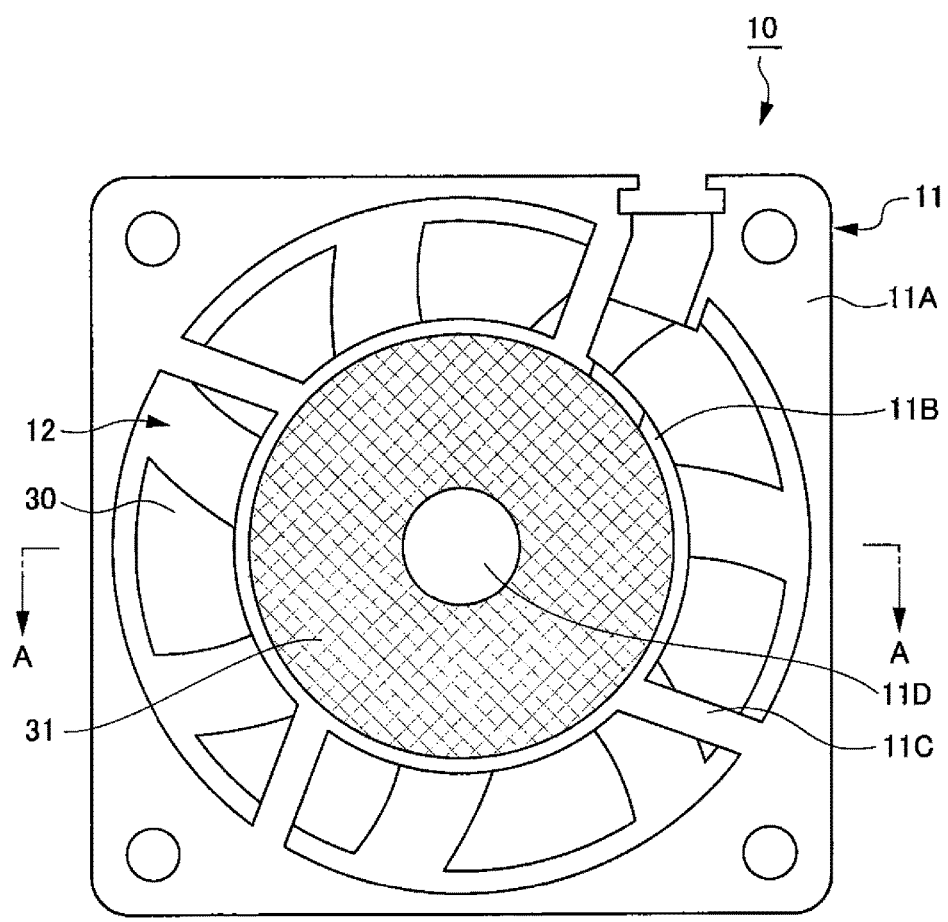
FIG. 1 is a plan view of a fan viewing from an air outlet side according to a first embodiment of the present invention.

Hereinafter, the embodiments for carrying out the present invention will be described in detail with reference to the accompanying drawings. In the following description, it should be understood that the expression indicating a direction such as up and down, horizontal, vertical and the like is not absolute. It refers to the orientation of the fan as represented in the drawings but when the orientation of the fan changes, the expression should be changed accordingly.

Figure 2:
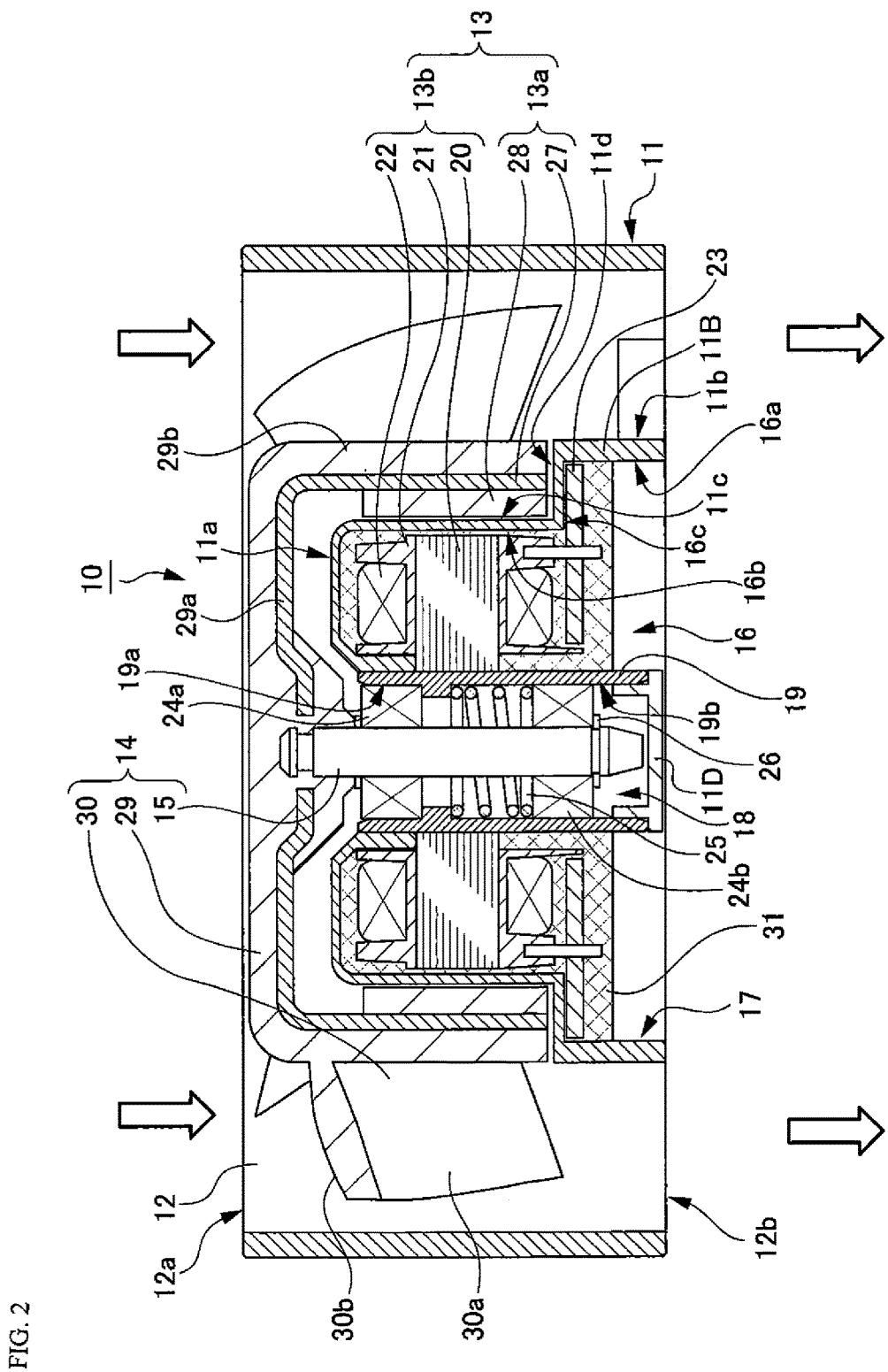
FIG. 2 is an enlarged cross-sectional view of FIG. 1 along line A-A.
Figure 3:
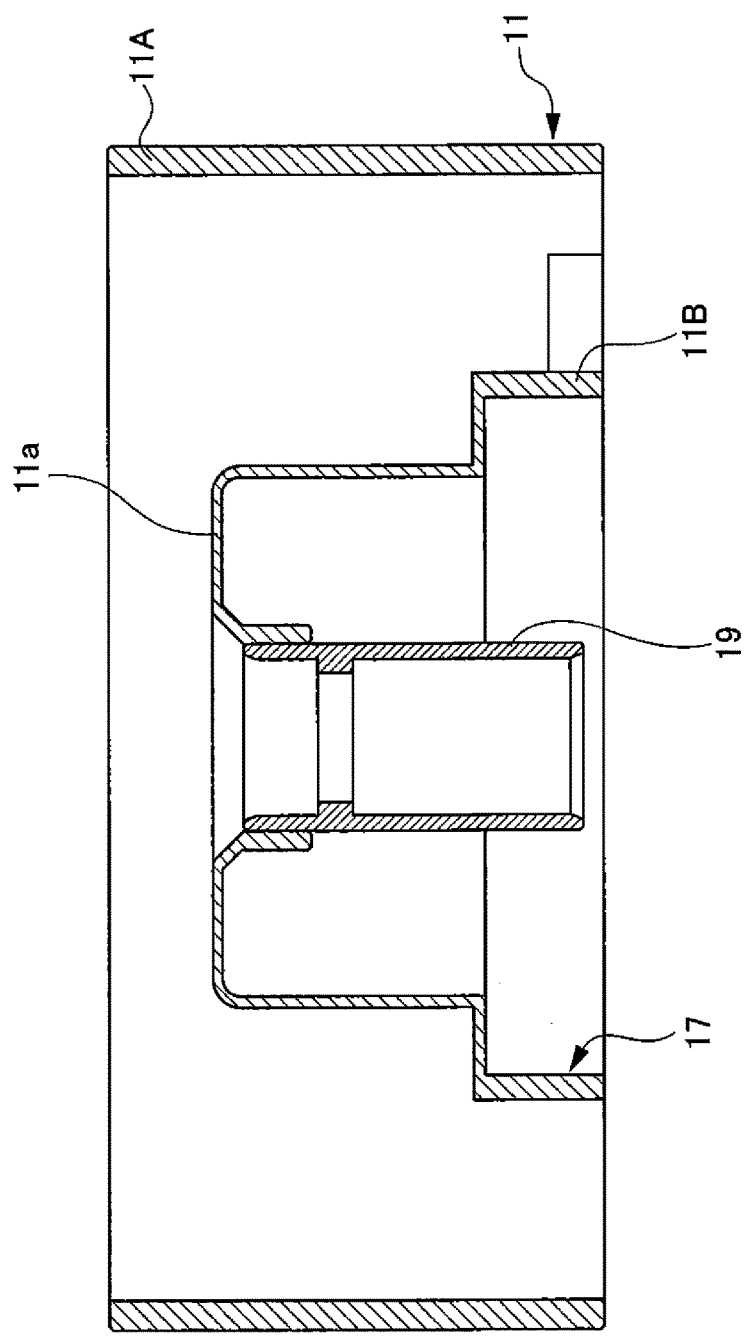
FIG. 3 is a cross-sectional view showing a casing and a bearing housing of FIG. 1.
Figure 4:
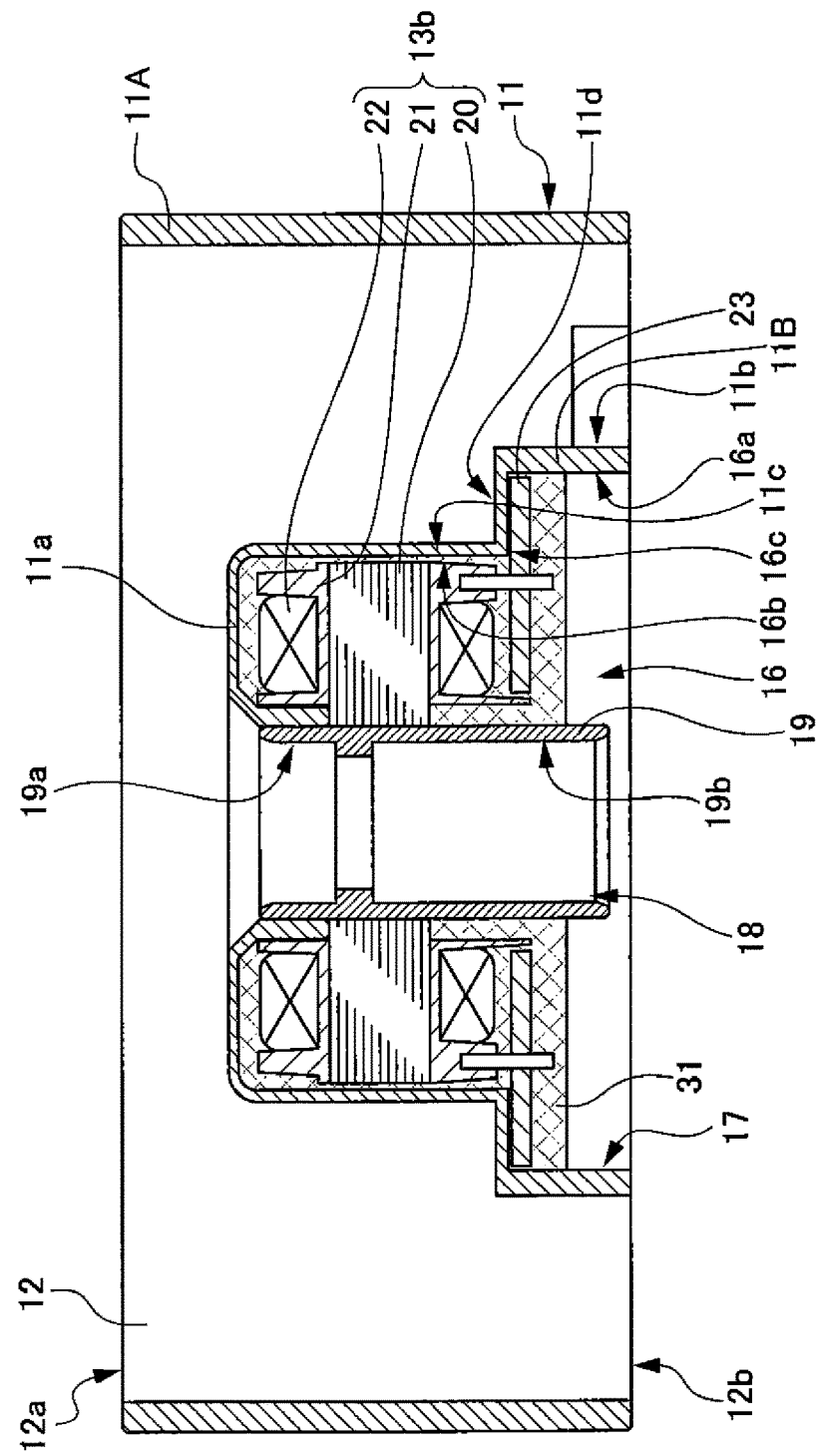
FIG. 4 is a cross-sectional view showing a stator having a circuit board being fixed thereto for driving a motor, the bearing housing and the casing in FIG. 1.
Figure 5:
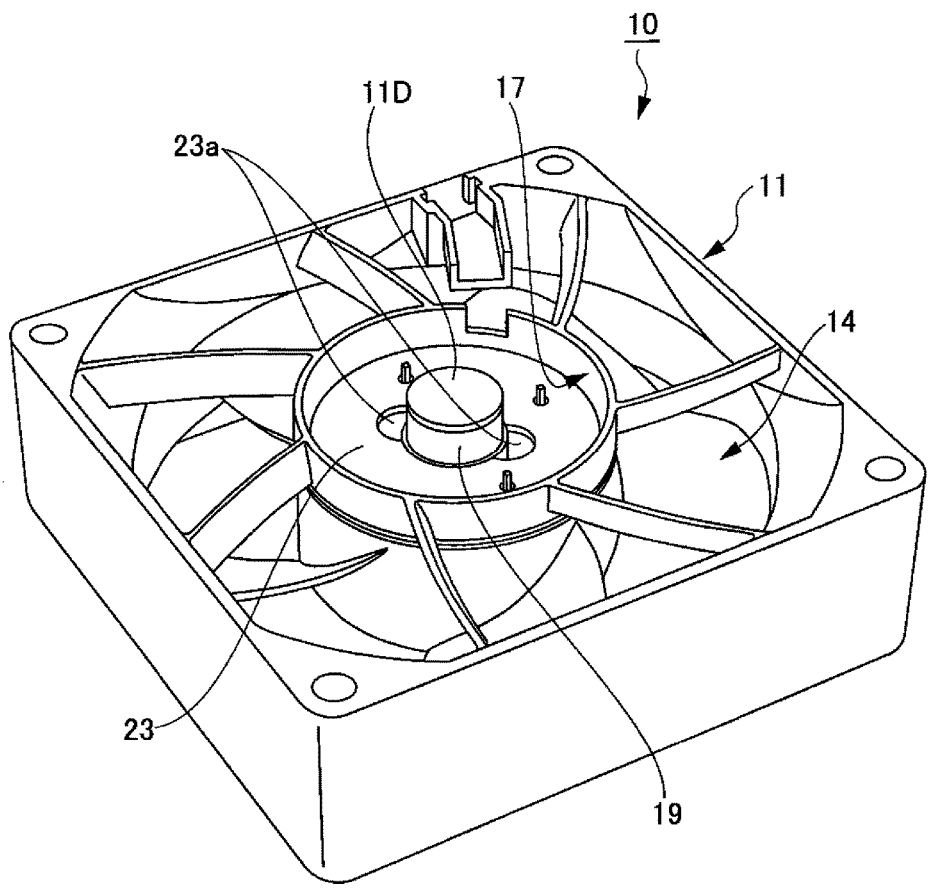
FIG. 5 is a perspective view showing a state prior to filling the fan in FIG. 1 with an insulating material.

A first embodiment of the present invention will be described below. FIGS. 1 to 5 indicate an axial flow fan according to the first embodiment. FIG. 1 is a plan view of the axial fan viewed from an air outlet side FIG. 2 is an enlarged cross-sectional view of FIG. 1 along line A-A, FIG. 3 is a cross-sectional view extracted from FIG. 1 showing a casing in which a bearing housing hangs down from the center, FIG. 4 is a cross-sectional view extracted from FIG. 1 showing the casing in a state that a stator having a circuit board for driving a motor fixed thereto is installed to the bearing housing and disposed inside a stator housing portion, and FIG. 5 is a perspective view showing a state prior to filling the fan in FIG. 1 with an insulating material.

As shown in FIG. 2, a fan 10 comprises a casing 11, a motor 13 mounted in the casing 11, and an impeller 14 which rotates together with a rotor 13a of the motor 13. In addition, the rotor 13a, of the motor 13 is incorporated in the impeller 14, and rotates integrally with a shaft 15 of the impeller 14.

As shown in FIG. 1, the casing 11 has an outer frame 11A, a base portion 11B provided at the center of the outer frame 11A, a plurality (four pieces in the present embodiment) of ribs 11C connecting the outer frame 11A and the base portion 11B, integrally. As shown in FIG. 1, FIG. 2 and FIG. 5, the casing 11 is also provided with a bottom cap 11D which is mounted fixedly so as to close an opening at the lower side of a bearing housing 19 being provided to the base portion 11B. A substantially annular shaped air passage 12 provided with an air inlet 12a and an air outlet 12b respectively at each end side is formed between the base portion 11B and the outer frame 11A. Further, the four ribs 11C are disposed to the side of the air outlet 12b, and by providing the ribs 11C, the air outlet 12b is divided into four in the circumferential direction, as shown in FIG. 1.

As shown in FIG. 2, FIG. 3 and FIG. 5, the base portion 11B protruding from the lower surface side (the side of the air outlet 12b) to the upper surface side (the side of the air inlet 12a), is provided with a circular top surface portion 11a on the abutment surface of the inner side and is provided with an lower opening 17 at the lower surface, so as to form a cup-shaped outline. Further, in the center of top surface portion 11a, a hollow cylindrical shaped bearing housing 19 which extends from the top surface portion 11a and hangs downward to the direction of the lower opening 17 is disposed fixedly. And, a stator housing portion 16 is formed by the bearing housing 19 and the base portion 11B. In other words, the lower opening 17 of the base portion 11B is also an opening of the stator housing portion 16.

Further, as shown in FIG. 2 and FIG. 4, the inner peripheral side of the base portion 11B, that is, the inside of the stator housing portion 16 is provided with a large diameter portion 16a on the side of the lower opening 17, a small diameter portion 16b formed with an inner diameter smaller than the inner diameter of the large diameter portion 16a on the upper side (the side of the air inlet 12a) of the large diameter portion, and a horizontal stepped surface 16c connecting the large diameter portion 16a and the small diameter portion 16b at the boundary portion between the large diameter portion 16a and the small diameter portion 16b. Similarly, on the outer peripheral side of the base portion 11B, a large diameter portion 11b formed on the outer side corresponding to the large diameter portion 16a, a small diameter portion 11c formed in a smaller outer diameter than the outer diameter of the large diameter portion 11b on the outer side corresponding to the small diameter portion 16b, and a horizontal stepped surface 11d connecting the large diameter portion 11b and the small diameter portion 11c on the outer side corresponding to the horizontal stepped surface 16c.

As shown in FIG. 2, the motor 13 is composed of the rotor 13a mounted to the side of the impeller 14, and a stator 13b mounted fixedly to the side of the casing 11. The motor 13 rotationally drives the impeller 14 by rotating the rotor 13a with regard to the stator 13b.

As shown in FIG. 2 and FIG. 4, the stator 13b is disposed to the inside of the stator housing portion 16 by being inserted through the lower opening 17 and fitted to an outer peripheral surface of the bearing housing 19. The stator 13b is provided with an iron core being fitted and mounted to the outer periphery of the bearing housing 19, a coil 22 for driving being wound to the iron core 20 through an insulator 21, and a circuit board 23 for driving the motor 13 which includes electronic components for controlling a driving current supplied to the coil 22. The circuit board 23 is fixedly mounted to the insulator 21 at the lower portion of the stator 13b and integrated with the stator 13b, and is connected to an external power source (not shown) through a lead wire (not shown). In addition, with regard to the stator housing portion 16 after the stator 13b is disposed, the insulating material 31 is poured from the lower opening 17 and the stator 13b and the circuit board 23 are covered with the insulating material 31. Note that the stator 13b may be mounted to outer peripheral surface of the bearing housing 19, after filling the inside of the stator housing portion 16 with the insulating material 31. Further, the insulating material can be appropriately selected from an epoxy resin, a silicone rubber, a rubber, a polyurethane resin, and the like, as far as it has an insulating function.

With regard to the bearing housing 19, concave portions 19a, 19b are formed respectively on the inner periphery of the upper end and on the inner periphery of the lower end in the axial direction, and a pair of bearings 24a, 24b are housed in each of the concave portions 19a, 19b. The bearing housing 19 is sometimes called a cylindrical portion in the description. Rolling bearings are described for the bearings 24a, 24b in this embodiment, but sliding bearings may be used instead of rolling bearings.

The shaft 15 is rotatably mounted to the inner periphery of the bearings 24a, 24b. In addition, in the concave portion 19b, a coil spring 25 is mounted as a preloading spring on the outer periphery portion of the shaft 15 between the bearing 24b at the lower side of the shaft 15 and the bearing housing 19. In addition, a retaining ring 26 is mounted to the outer periphery portion at the lower side of the bearing 24b, and the bearing 24b and the coil spring 25 are retained to the shaft 15 by the retaining ring 26.

As shown in FIG. 2, the rotor 13a comprises a magnetic yoke 27 disposed in the inner peripheral surface of a hub 29 in the impeller 14 which is described in detail later, and a rotor magnet 28 which is disposed in the inner peripheral surface of the magnetic yoke 27.

As shown in FIG. 1 and FIG. 2, the impeller 14 is composed of the shaft 15, the hub 29 which rotates together with the shaft 15, and a plurality of blades 30.

The hub 29 is made by injection molding a conventional resin material (a plastic such as PBT, ABS and the like). When molding it, the magnetic yoke 27 formed with a circular cross section and a cup like shape which is closed at one end (upper end) and opened at the other end (lower end), and which is provided with the rotor magnet 28 of the rotor 13a on the inner peripheral surface, and the shaft 15 are disposed in the forming mold (not shown). Then, as shown in FIG. 2, by injecting the resin material into the forming mold, a circular top plate portion 29a which is connected to the shaft 15 at the center and a cylindrical portion 29b which extends downward along the axial direction from the outer peripheral end of the top plate portion 29a are disposed, and the hub 29 is formed with a circular cross section and a cup like outline which is closed at the upper end side and opened at the lower end side together with the rotor 13a. Further, at the same time, the plurality of blades 30 (seven blades in FIG. 1) are formed integrally on the outer peripheral surface of the circular cylindrical portion 29b of the hub 29.

Further, with regard to the rotor 13a which is integrated with the impeller 14, the shaft 15 is disposed to the inside of the bearing housing 19 from the side of the air inlet 12a and the shaft 15 is rotatably supported by the bearings 24a, 24b, and then, as shown in FIG. 2, the small diameter portion 11c of the base portion 11B is disposed to the inside of the rotor 13a, and the rotor magnet 28 of the rotor 13a is disposed so as to face the stator 13b, which is housed in the stator housing portion 16, via the small diameter portion 11c of the base portion 11B.

Then, in the fan 10 having such a configuration, the rotor 13a moves and the impeller 14 rotates when a predetermined drive current is supplied to the coil 22 of the motor 13 from the circuit board 23. Due to this rotation, the surface of the side to which the front wall 30a of each blade 30 pushes the air (pressure surface) and the surface of the rear wall 30b of the opposite side become a surface of the side for sucking the air (negative pressure surface), and air flow in the axial direction is created where the air in front of the casing 11 is sucked into the casing 11 through the air inlet 12a and is discharged from the air outlet 12b at the lower side. In the FIG. 2, the outlined arrow indicates the air flow. As a result, in the control unit of a machine tool and the like which is provided with this fan 10, ventilation (air circulation) is performed and internal cooling is made.

In addition, in the structure of this fan 10, the stator 13b with the circuit board 23 attached in the lower portion is fixed to the bearing housing 19 in the stator housing portion 16, and then the insulating material 31 is injected from the lower opening 17 of the stator housing portion 16 and the stator 13b and the circuit board 23 are covered with the insulating material 31. Therefore, the stator 13b and the circuit board 23 are isolated from the environment such as water, the cutting fluid and the like and a waterproof function can be realized. Thus, without using a forming mold for sealing the stator 13b and the circuit board 23 with resin to form the waterproof structure, a structure of the fan having a waterproof function is realized. Further, because the opening 18 of the bearing housing 19 is closed with a bottom cap 11D, the two bearings 24a, 24b disposed in the bearing housing 19 can be isolated from the environment such as water, the cutting fluid and the like. Further, as shown in FIG. 5, by providing an opening portion 23a to the circuit board 23, it makes easier to fill the stator housing portion 16 with the insulating material 31 through the opening portion 23a when the insulating material 31 is injected to the stator housing portion 16 from the lower opening 17, and it becomes easier to isolate the stator 13b and the circuit board 23 from the environment such as water, the cutting fluid and the like, and the waterproof function is realized.

Figure 6:
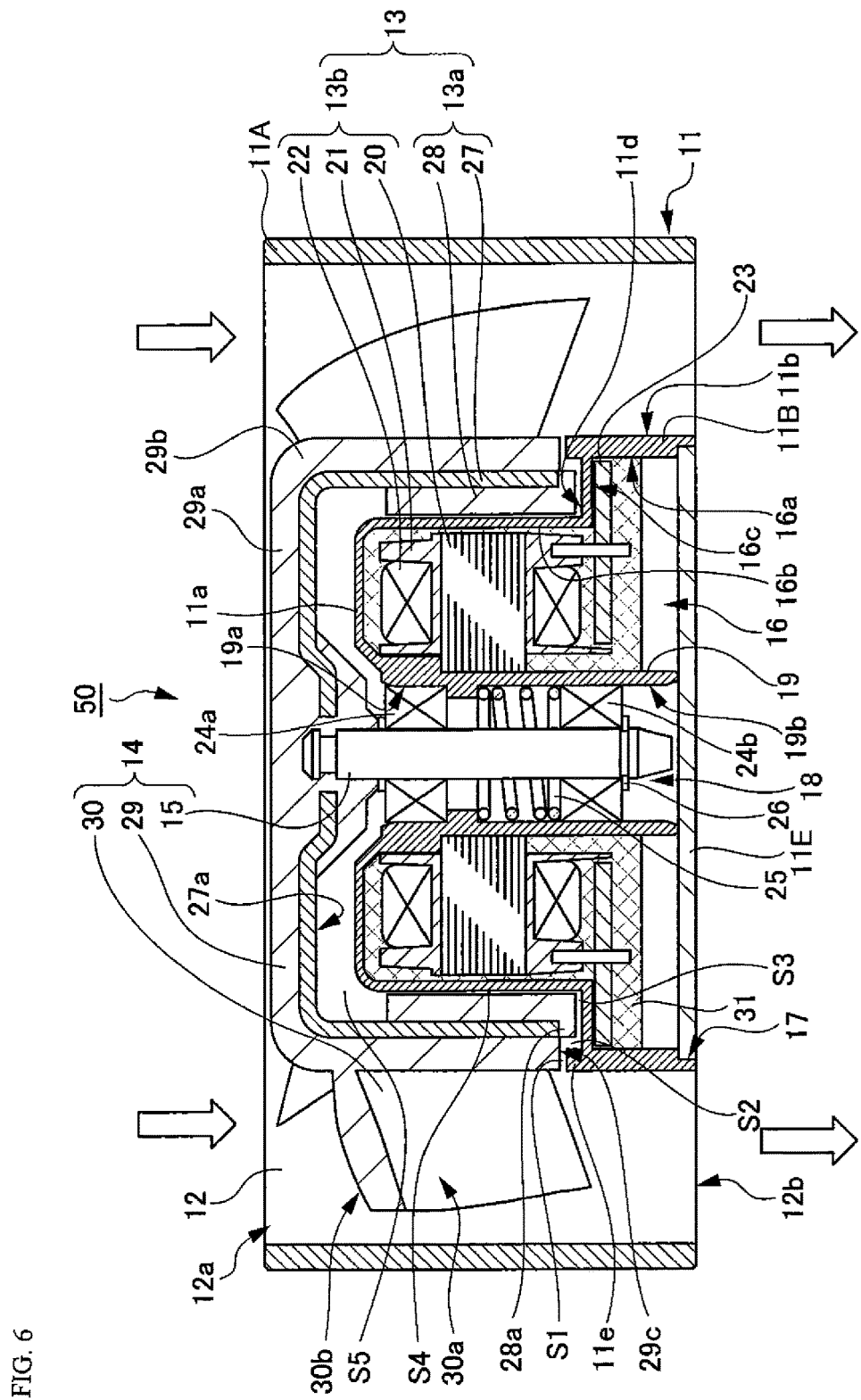
FIG. 6 is a cross-sectional view showing a fan according to a second embodiment of the present invention.
Figure 7:
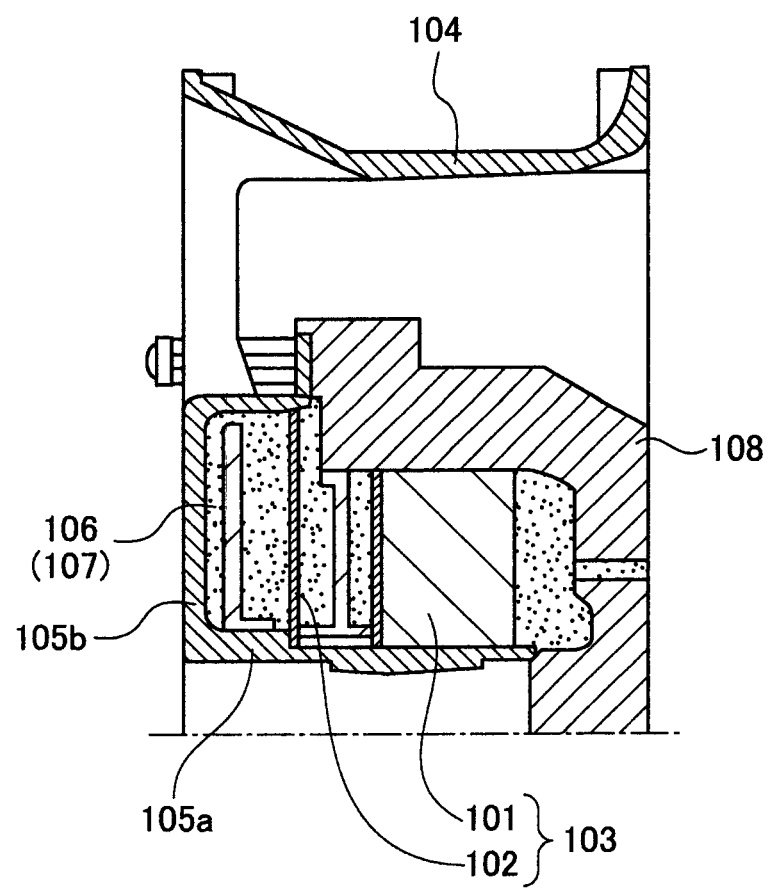
FIG. 7 is an explanatory drawing illustrating a fan with a conventional waterproof structure.
Figure 8:
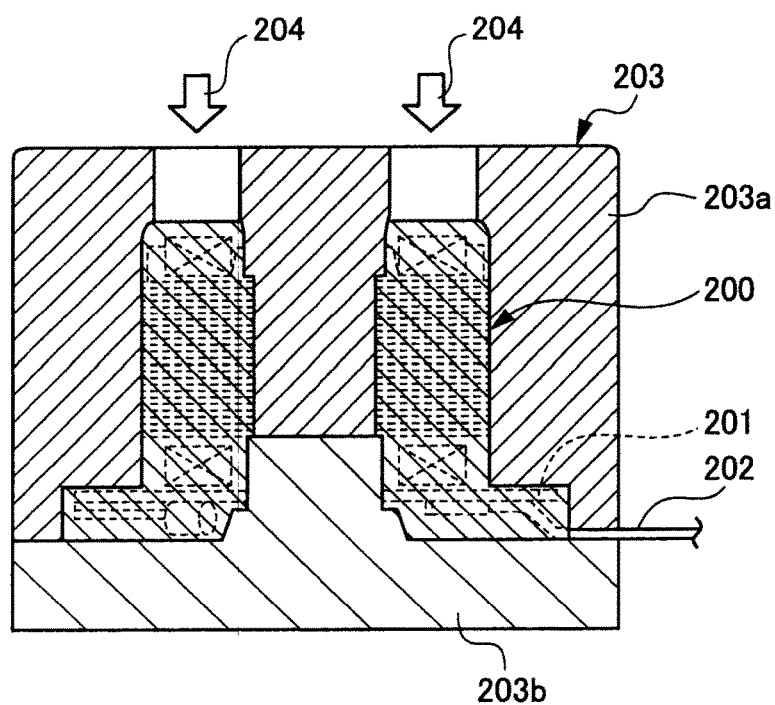
FIG. 8 is another explanatory drawing illustrating a fan with a conventional waterproof structure.

Next, a second embodiment of the present invention will be described below. FIG. 6 shows a cross-sectional view showing a fan according to the second embodiment. The main differences in the structure between the fan 10 according to the first embodiment shown in FIGS. 1 to 5 and the fan 50 of the second embodiment are the points (1) to (3) described below.

(1) As shown in FIG. 3, whereas the bearing housing 19 is formed separately and then connected to the base portion 11B in the fan 10 according to the first embodiment, the base portion 11B and the bearing housing 19 are formed integrally from the beginning in the fan 50 according to the second embodiment.

(2) As shown in FIG. 2, whereas each height position of the lower surfaces in the open side of the impeller 14, the magnetic yoke 27 and the rotor magnet 28 is matched and each lower surface faces the horizontal stepped surface 11d of the base portion 11B keeping the same distance in the fan 10 according to the first embodiment, each of the impeller 14, the magnetic yoke 27 and the rotor magnet 28 is formed in a position different from each other so that the height position of the lower surface of the rotor magnet 28 in the open side becomes lower than each height position of the lower surface of the hub 29 of the impeller 14 and the magnetic yoke 27 in the open side, and the annular protruding portion 11e is disposed to the outer peripheral end portion of the horizontal stepped surface 11d in the base portion 11B so as to face the lower surface of the circular cylindrical portion 29c of the hub 29 in the impeller 14 in the fan 50 according to the second embodiment.

(3) As shown in FIG. 3, whereas the bottom cap 11D is mounted to the opening 18 of the bearing housing 19 in the fan 10 according to the first embodiment, the bottom lid 11E is mounted to the base portion 11B so as to close the lower opening 17 in the fan 50 according to the second embodiment.

Accordingly, because the configuration of the second embodiment is same as the configuration of the first embodiment except the points described in the above points (1) to (3), the duplicated explanations are omitted by giving the same reference numeral to the portion of the same configuration.

In FIG. 6, in order to improve the waterproof effect by increasing the airtightness between the stator housing portion 16 and the bearing housing 19 which are parts of the casing 11, and to improve the coaxiality between the base portion 11B and the bearing housing 19, the base portion 11B and the bearing housing 19 are integrally formed in the fan 50.

Further, a flange portion 28a being disposed toward the outside along the lower surface of the magnetic yoke 27 is formed integrally on the lower end periphery of the rotor magnet 28 in the open side. Further, the lower surface 29c of the cylindrical part of the hub 29 and the lower surface of the magnetic yoke 27 are matched, and thereby the rotor 13a and the impeller 14 is integrally formed in a state where the flange portion 28a is projected to the side lower than the lower surface 29c of the cylindrical part of the hub 29 (the side of the horizontal stepped surface 11d). On the other hand, an annular protruding portion 11e is provided integrally with the base portion 11B on the annular outer periphery of the base portion 11B. The annular protruding portion 11e is projected from the horizontal stepped surface 11d toward the lower surface 29c of the hub 29, and is formed so that the inner peripheral surface is disposed facing the outer peripheral side surface of the flange portion 28a of the rotor magnet 28, namely a part of the outer peripheral side surface of the rotor 13a.

The structure where the annular protruding portion 11e is disposed along the outer peripheral side surface of the rotor 13a makes it possible to make the gap between the outer peripheral surface of the base portion 11B and the inner peripheral surface of the rotor 13a in a labyrinth-like configuration and thus to form a labyrinth seal, and so the foreign matters such as oil, water and the like which is entering the inside of the bearing housing 19 passing through the gap S1 between the lower surface 29c of the hub 29 and the annular protruding portion 11e are eliminated.

In other words, the foreign matters such as oil, water and the like cannot reach the inside of the bearing housing 19 unless passing through the gaps S1 to S5 in turn: a gap Si extending in the horizontal inward direction perpendicular to a central axis of the bearing housing 19 between the lower surface 29c of the cylindrical portion of the hub 29 and the end surface of the annular protruding portion 11e; a gap S2 extending parallel and in the vertical downward direction in relation to the central axis between the inner peripheral surface of the annular protruding portion 11e and the outer peripheral side surface of the flange part 28a of the rotor magnet 28 (rotor 13a); a gap S3 extending in the horizontal inward direction perpendicular to the central axis between the horizontal stepped surface 11d (upper surface of the base portion 11B) and the lower surface of the rotor magnet 28 (rotor 13a); a gap S4 extending parallel and in the vertical upward direction in relation to the central axis between the inner peripheral side surface of the rotor magnet 28 (rotor 13a) and the outer peripheral side surface of the stator housing portion 16; a gap S5 extending in the horizontal inward direction perpendicular to the central axis between the inner top surface 27a of the magnetic yoke 27 (rotor 13a) and the outer top surface 11a of the stator housing portion 16.

Accordingly, because the foreign matters cannot reach the inside of the bearing housing 19 unless passing through the gaps S1-S5 having a labyrinth configuration, it is possible to prevent the foreign matters entering in the portions of the bearings 24a, 24b supported by the bearing housing 19, and the waterproof effect to the stator 13b and the circuit board 23 is further enhanced.

Further, in the structure of this fan 50, because the lower opening 17 of the lower surface of the stator housing portion 16 is closed by the bottom lid 11E, the stator 13b and the circuit board 23 which are covered with the insulating material 31 are sealed within stator housing portion 16, the stator 13b and the circuit board 23 are isolated from the environment such as water, the cutting fluid, and the like, and the waterproof function can be realized. The waterproof effect to the stator 13b and the circuit board 23 is further enhanced thereby.

The first embodiment and the second embodiment are concretely described as above. According to the first embodiment and the second embodiment, the following advantageous effects can be obtained.

In both of the first embodiment and the second embodiment, it is configured that the bearing housing 19 integrally hangs down from the center of the top surface portion 11a of the base portion 11B, namely from the center of the top surface portion of the stator housing portion 16.

Specifically, in the first embodiment, the peripheral wall of the central hole positioned at the center of the top surface portion 11*a* projects toward the lower opening 17, and the bearing housing 19 is integrated by being fixed to the peripheral wall. According to this configuration, it is possible to dispose the bearing housing 19 in high positional accuracy in relation to the base portion 11B. In the second embodiment, the bearing housing 19 is integrated by integrally forming it with the base portion 11B at the center of the top surface portion 11*a*. According to this configuration, the bearing housing 19 and the base portion 11B are formed in one piece and it is possible to dispose the bearing housing 19 in much more higher positional accuracy in relation to the base portion 11B as compared with the first embodiment.

As the bearing housing 19 can be provided with higher positional accuracy in relation to the base portion 11B, the coaxiality between the base portion 11B and the bearing housing 19 can be obtained with higher accuracy. Accordingly, this results also in an improved coaxiality of the bearings 24*a*, 24*b* and the stator 13*b*, which are attached to the bearing housing 19, in relation to the base portion 11B, and further the coaxiality of a rotating part including the impeller 14 and the rotor magnet 28, which are supported by the bearings 24*a*, 24*b* via the shaft 15, in relation to the outer peripheral surface of the base portion 11B is also improved. Consequently, interference between the stator 13*b* and the base portion 11B and between the rotor magnet 28 and the base portion 11B after assembled is prevented.

In case the deviation of coaxiality is large, it is needed to set larger gaps between the outer peripheral surface of the stator 13*b* and the inner peripheral surface of the base portion 11B, and between the inner peripheral surface of the rotor magnet 28 and the outer peripheral surface of the base portion 11B so as to prevent interference during assembling and after assembled (i.e., in operation). In contrast, highly accurate coaxiality as described above makes it possible to set smaller gaps.

If the gaps are made smaller, the efficiency of the motor increases because the distance between the stator 13*b* and the rotor magnet 28 is shortened, and then the electricity consumption can be reduced.

In addition, in both of the first embodiment and the second embodiment, the lower surface of the stator housing portion 16 is widely opened with nothing to obstruct, because the stator housing portion 16 has an integrated structure in which the bearing housing 19 hangs down from the center of the top surface portion of the base portion 11B. Therefore, it is easy to assembly the stator 13*b* with the circuit board 23 to the outer peripheral surface of the bearing housing 19 from the lower opening 17 of the stator housing portion 16 and to fill it with the insulation resin 31 for covering the stator 13*b* and the circuit board 23, because the work of filling can be performed from the lower opening which is widely opened. Furthermore, because the lower opening 17 is wide, it is possible to verify the condition of the assembled stator 13*b* before filling with the insulation resin 31 and perform a check of the filling amount of the insulation resin 31 by viewing from the lower opening 17. Thus, it is easy to fill the stator housing portion 16 with an accurate amount of the insulation resin 31. By this way, the manufacturing process becomes easier because the lower opening of the stator housing portion 16 is wide.

Note that in the above embodiments, the description has been given on an axial flow fan, but the present invention is not limited to the axial flow fan. For example, a motor without the outer frame 11A, the rib 11C and the impeller 14, or a motor with the impeller 14 except the outer frame 11A and the rib 11C may be applicable. Any modification, any improvement and the like in a range that can achieve the object of the present invention are included in the present invention.

"Solution to Problem" described in the basic application for claiming priority is added as below.

(1) The fan according to the present invention comprises: a motor, having a stator being wound with a coil and a circuit board for driving the motor being fixed to the lower portion of the stator, and having a rotor of a cup shaped outline, a rotor magnet being fixed to the inner surface of the rotor, a shaft being attached to the center of the rotor, the rotor being disposed to face the stator; an impeller for creating an air flow being fixed to the outer periphery portion of the rotor and rotating together with the rotor; a casing supporting the stator and the shaft; and a bearing housing being provided with a bearing for supporting the shaft, wherein the casing comprises: an outer frame; a base portion of a cup shaped outline being provided with a stator housing portion, the bearing housing hanging down in the center from a top surface portion, and having an opening in the lower surface, and the stator being housed in the stator housing portion through the opening in the lower surface and being attached to the bearing housing; and a rib for joining the outer frame and the base portion, wherein the stator housing portion is filled with an insulating material, wherein the stator and the circuit board are covered with the insulating material.

According to this configuration, the stator and the circuit board are sealed within the stator housing portion, by housing the stator with the circuit board in the stator housing portion and mounting the stator to the bearing housing, and then injecting the insulating material to the stator housing portion. As a result, the stator and the circuit board are isolated from the environment such as water, the cutting fluid and the like, and the waterproof capability is obtained. Thus, a fan with a waterproof structure of the stator and the circuit board can be provided without using a forming mold.

(2) A configuration in which the casing and the bearing housing are integrally formed is preferred.

According to this configuration, by making the bearing housing and the casing as one piece, the airtightness of the stator housing portion which is a part of the casing is improved, and the waterproof effect is further improved.

(3) A configuration that the circuit board is provided with an opening portion for filling the stator housing portion with the insulating material is preferred.

According to this configuration, it is easy to fill the stator housing portion with the insulating material, and the waterproof effect of the stator housing portion is further improved.

(4) A configuration that the lower end of the bearing housing is closed by a bottom cap is preferred.

According to this configuration, the lower end portion of the bearing housing is sealed, and so the waterproof structure of the bearing portion can be obtained easily.

(5) A configuration that the bottom lid closes the entire opening of the stator housing portion is preferred.

According to this configuration, the bottom lid closes the lower portions of the the bearing housing and the stator housing portion which is waterproofed by the insulating resin, and so the waterproof effect is further improved.

(6) A configuration is preferred wherein the base portion has an annular protruding portion projecting toward the lower end surface of the impeller from a side facing the bottom opening of the rotor, and an end surface of the annular protruding portion faces the lower end surface of the impeller, and an inner circumferential surface of the annular protruding portion is disposed along the outer peripheral surface of the rotor.

According to this configuration, foreign matters such as water, oil and the like, which may enter into the bearing housing through the gap between the lower surface of the cylindrical portion of the impeller and the front end surface of the annular protruding portion, cannot reach the inside of the bearing housing unless passing through the following gaps S1-S5 in turn: a gap S1 extending in the horizontal inward direction in relation to the center axis of the bearing housing between the lower surface of the cylindrical portion of the impeller and the front end surface of the annular protruding portion; a gap S2 extending parallel and in the vertical downward direction in relation to the center axis between the inner peripheral surface of the annular protruding portion and the outer peripheral side surface of the rotor; a gap S3 extending in the horizontal inward direction in relation to the center axis between the upper surface of the base portion and the lower surface of the cylindrical portion of the rotor; a gap S4 extending parallel and in the vertical upward direction in relation to the center axis between the inner peripheral side surface of the rotor and the outer peripheral side surface of the stator housing portion; a gap S5 extending in the horizontal inward direction in relation to the center axis between the inner top surface of the rotor and the outer top surface of the stator housing portion. In other words, because the foreign matters such as water, oil and the like, which are entering into the bearing housing from the outside of the impeller cannot reach the inside of the bearing housing unless passing through the gaps S1-S5 which have a labyrinth structure, the intrusion of the foreign matters into the portions of the bearings supported by the bearing housing can be prevented and the waterproofing effect on the stator and the circuit board are further improved.

REFERENCE SIGNS LIST

10 . . . fan, 11 . . . casing, 11A . . . outer frame, 11B . . . base portion, 11a . . . top surface portion, 11e . . . annular protruding portion, 11C . . . rib, 11D . . . bottom cap (of bearing housing), 11E . . . bottom lid (of stator housing portion), 13 . . . motor, 13a . . . rotor, 13b . . . stator, 14 . . . impeller, 15 . . . shaft, 16 . . . stator housing portion, 16c . . . stepped surface, 17 . . . lower opening (of base portion/stator housing portion), 18 . . . opening (of bearing housing), 19 . . . bearing housing, 22 . . . coil, 23 . . . circuit board, 23a . . . opening portion (of circuit board), 28 . . . rotor magnet, 31 . . . insulating material, 50 . . . fan

The invention claimed is:

1. A fan comprising:
a casing comprising a cup-shaped base portion connected to an outer frame through a rib, the base portion having a top surface located at an upper end of the base portion in an axial direction, a circumferential wall extending in the axial direction from an outer periphery of the top surface and a lower opening located at a lower end of the base portion in the axial direction and defined by a lower axial end of the circumferential wall of the base portion;
a bearing housing having a circumferential wall extending from a central portion of the top surface of the base portion toward the lower opening of the base portion and arranged coaxially with a shaft, and a lower opening defined by a lower axial end of the circumferential wall of the bearing housing;
a stator housing portion defined by the circumferential wall of the base portion, the top surface of the base portion, and the circumferential wall of the bearing housing, and having a lower opening;
a stator provided with a circuit board and disposed in the stator housing portion by being fitted to an outer surface of the circumferential wall of the bearing housing;
a bearing fitted to an inner surface of the circumferential wall of the bearing housing;
an impeller rotating around the shaft as a central axis, the shaft being rotatably supported by the bearing; and
an insulating material provided in the stator housing portion to cover the stator and the circuit board,
wherein the insulating material is exposed to an outside via the lower opening of the stator housing portion,
wherein the lower opening is formed from the outer surface of the circumferential wall of the bearing housing to an inner surface of the circumferential wall of the base portion, and
wherein the lower axial end of the circumferential wall of the bearing housing is disposed between the lower axial end of the circumferential wall of the base portion and the circuit board in the axial direction.

2. The fan according to claim 1, wherein the base portion and the bearing housing are integrally formed.

3. The fan according to claim 1, wherein the central portion of the top surface comprises a central hole.

4. The fan according to claim 1, wherein the circuit board is fixed to a lower portion of the stator and provided with an opening portion to fill the stator housing portion with the insulating material.

5. The fan according to claim 1, wherein the bearing housing is closed at the lower axial end thereof by a bottom cap.

6. The fan according to claim 1, wherein the lower opening of the base portion is closed by a bottom lid.

7. The fan according to claim 1, wherein the base portion has a large-diameter portion with a first diameter, a small-diameter portion with a second diameter that is smaller than the first diameter, and a horizontal step surface connecting the large-diameter portion and the small-diameter portion,
wherein the large-diameter portion, the horizontal step and the small-diameter portion are disposed in this order from the lower opening side in the axial direction,
wherein the horizontal step surface has along an outer peripheral surface thereof an annular protruding portion projecting toward a lower end surface of the impeller, and
wherein the protruding portion has an inner peripheral surface facing at least a part of an outer peripheral surface of a rotor which rotates integrally with the impeller.

8. A method of manufacturing a fan, comprising:
forming:
a casing comprising a cup-shaped base portion connected to an outer frame through a rib, the base portion having a top surface located at an upper end of the base portion in an axial direction, a circumferential wall extending in the axial direction from an outer periphery of the top surface, and a lower opening located at a lower end of the base portion in the axial direction and defined by a lower axial end of the circumferential wall of the base portion;
a bearing housing having a circumferential wall extending from a central portion of the top surface of the base portion toward the lower opening of the base portion and arranged coaxially with a shaft, and a lower opening defined by a lower axial end of the circumferential wall of the bearing housing; and a stator housing portion defined by the circumferential wall of the base portion, the top surface of the base portion, and the circumferential wall of the bearing housing, and having a lower opening;

inserting a bearing into the bearing housing through the lower opening of the bearing housing;

inserting a stator which is provided with a circuit board into the stator housing portion through the lower opening of the stator housing portion to place the stator inside the stator housing portion;

filling an insulating material through the lower opening of the stator housing portion to cover the stator with the insulating material after placing the stator inside the stator housing portion, wherein the insulating material is exposed to an outside via the lower opening of the stator housing portion, and wherein the lower opening is formed from an outer surface of the circumferential wall of the bearing housing to an inner surface of the circumferential wall of the base portion, and solidifying the insulating material, wherein the process of inserting the stator includes disposing the lower axial end of the circumferential wall of the bearing housing between the lower axial end of the circumferential wall of the base portion and the circuit board in the axial direction.

9. The fan according to claim 1, wherein the lower opening of the stator housing portion remains opened.

10. The method according to claim 8, further comprising mounting a bottom lid to close the lower opening of the base portion after solidifying the insulating material.

* * * * *